US012722520B2

(12) United States Patent
Joisten-Pieritz

(10) Patent No.: US 12,722,520 B2
(45) Date of Patent: Sep. 1, 2026

(54) FAST-CHARGING STATION AND METHOD FOR CHARGING ELECTRICALLY OPERATED LAND VEHICLES, WATERCRAFT, AIRCRAFT AND/OR WORK MACHINES AND/OR BATTERIES

(71) Applicant: DEUTZ Aktiengesellschaft, Cologne (DE)

(72) Inventor: Joachim Joisten-Pieritz, Kall-Steinfeld (DE)

(73) Assignee: DEUTZ Aktiengesellschaft, Cologne (DE)

( * ) Notice: Subject to any disclaimer, the term of this patent is extended or adjusted under 35 U.S.C. 154(b) by 537 days.

(21) Appl. No.: 17/605,782

(22) PCT Filed: Mar. 10, 2020

(86) PCT No.: PCT/EP2020/000059
§ 371 (c)(1),
(2) Date: Oct. 22, 2021

(87) PCT Pub. No.: WO2020/221473
PCT Pub. Date: Nov. 5, 2020

(65) Prior Publication Data

US 2022/0219559 A1 Jul. 14, 2022

(30) Foreign Application Priority Data

Apr. 27, 2019 (DE) ..................... 10 2019 003 050.8
Jul. 20, 2019 (DE) ..................... 10 2019 005 071.1

(51) Int. Cl.
*B60L 53/66* (2019.01)
*B60L 53/10* (2019.01)
(Continued)

(52) U.S. Cl.
CPC ............... *B60L 53/66* (2019.02); *B60L 53/11* (2019.02); *B60L 53/30* (2019.02); *B60L 53/50* (2019.02);
(Continued)

(58) Field of Classification Search
CPC .......... B60L 53/11; B60L 53/57; B60L 53/30; B60L 53/50; B60L 53/51; B60L 53/53;
(Continued)

(56) References Cited

U.S. PATENT DOCUMENTS 7,239,034 B2 * 7/2007 Gehret, Jr. .............. B60L 3/003 290/2
8,952,656 B2 * 2/2015 Tse .......................... B60L 53/63 320/109
(Continued)

FOREIGN PATENT DOCUMENTS

AU 2008264146 A1 * 7/2009 .......... B60L 11/1818
AU 2012202344 A1 * 11/2012 ................ B60L 3/12
(Continued)

OTHER PUBLICATIONS

Machine translation of Wang CN 102097832 A1 (Year: 2011).*

*Primary Examiner* — Bryce M Aisaka
(74) *Attorney, Agent, or Firm* — Davidson Kappel LLC

(57) ABSTRACT

A fast-charging station for charging electrically operated land vehicles, watercraft, aircraft and/or work machines and/or batteries, including at least one internal combustion engine and at least one fuel tank and/or a fuel cell and/or at least one generator and/or at least one backup battery and/or at least one high-power capacitor and/or at least one photovoltaic element and/or at least one flywheel store and/or a charging device and/or a mains connection.

12 Claims, 2 Drawing Sheets

(51) Int. Cl.

| | |
|---|---|
| ***B60L 53/30*** | (2019.01) |
| ***B60L 53/50*** | (2019.01) |
| ***B60L 53/51*** | (2019.01) |
| ***B60L 53/53*** | (2019.01) |
| ***B60L 53/54*** | (2019.01) |
| ***B60L 53/55*** | (2019.01) |
| ***B60L 53/56*** | (2019.01) |
| ***B60L 53/57*** | (2019.01) |

(52) U.S. Cl.
CPC ............... *B60L 53/51* (2019.02); *B60L 53/53* (2019.02); *B60L 53/54* (2019.02); *B60L 53/55* (2019.02); *B60L 53/56* (2019.02); *B60L 53/57* (2019.02); *B60L 2200/10* (2013.01); *B60L 2200/32* (2013.01); *B60L 2200/40* (2013.01)

(58) Field of Classification Search
CPC .......... B60L 53/54; B60L 53/55; B60L 53/56; B60L 53/66; B60L 2200/10; B60L 2200/32; B60L 2200/40; Y02T 10/7072; Y02T 90/12
See application file for complete search history.

(56) References Cited

U.S. PATENT DOCUMENTS

| | | | | |
|---|---|---|---|---|
| 8,963,481 | B2 * | 2/2015 | Prosser | B60L 53/00 320/105 |
| 9,035,499 | B2 * | 5/2015 | Kesler | B60L 53/63 307/104 |
| 9,941,708 | B2 * | 4/2018 | Keeling | B60L 53/30 |
| 10,207,592 | B1 * | 2/2019 | Warden | G05D 1/021 |
| 10,377,260 | B2 * | 8/2019 | Donnelly | B60L 58/12 |
| 10,560,050 | B2 * | 2/2020 | Raghunathan | H02S 30/20 |
| 10,744,895 | B2 * | 8/2020 | Marcial-Simon | B60L 53/305 |
| 10,800,279 | B2 * | 10/2020 | Bhat | B60L 53/14 |
| 11,155,153 | B2 * | 10/2021 | Cafeo | H02J 7/00045 |
| 11,288,717 | B2 * | 3/2022 | Tanaka | G01C 21/3423 |
| 11,400,821 | B2 * | 8/2022 | Galin | H02J 3/388 |
| 11,568,329 | B2 * | 1/2023 | Kawamoto | G06Q 10/0838 |
| 2009/0016923 | A1 | 1/2009 | Treutler et al. | |
| 2010/0060093 | A1 * | 3/2010 | Hunter | B60L 53/53 290/55 |
| 2010/0065344 | A1 * | 3/2010 | Collings, III | B60L 3/10 180/2.1 |
| 2010/0217485 | A1 | 8/2010 | Ichishi et al. | |
| 2012/0105003 | A1 * | 5/2012 | Laughner | B60L 53/57 320/109 |
| 2012/0109519 | A1 * | 5/2012 | Uyeki | B60L 53/68 701/426 |
| 2013/0254097 | A1 * | 9/2013 | Marathe | G07F 15/005 705/35 |
| 2014/0084679 | A1 | 3/2014 | Li et al. | |
| 2015/0091516 | A1 | 4/2015 | Blum et al. | |
| 2017/0191844 | A1 | 7/2017 | Gutruf et al. | |
| 2018/0009324 | A1 | 1/2018 | Gjinali et al. | |
| 2018/0290553 | A1 | 10/2018 | Malik et al. | |
| 2021/0104901 | A1 * | 4/2021 | Kanazawa | B60W 20/15 |
| 2021/0380012 | A1 * | 12/2021 | Tsuda | B60L 53/66 |
| 2022/0016987 | A1 * | 1/2022 | Döner | B60L 53/54 |

FOREIGN PATENT DOCUMENTS

| | | | | | |
|---|---|---|---|---|---|
| CA | 2797575 | A1 | * | 11/2011 | B60L 11/1833 |
| CN | 102097832 | A | * | 6/2011 | B60L 3/0046 |
| CN | 102255350 | A | * | 11/2011 | B60L 53/11 |
| CN | 102474110 | A | * | 5/2012 | B60L 11/1816 |
| CN | 103660967 | A | | 3/2014 | |
| CN | 104518551 | A | | 4/2015 | |
| CN | 104918819 | A | * | 9/2015 | B60L 3/12 |
| CN | 204859068 | U | * | 12/2015 | |
| CN | 105270190 | A | * | 1/2016 | |
| CN | 106481414 | A | * | 3/2017 | F01D 15/10 |
| CN | 106938613 | A | | 7/2017 | |
| CN | 108074017 | A | | 5/2018 | |
| CN | 207416582 | U | * | 5/2018 | |
| CN | 108202641 | A | | 6/2018 | |
| CN | 108248428 | A | * | 7/2018 | |
| CN | 108556661 | A | | 9/2018 | |
| CN | 109334502 | A | * | 2/2019 | G07F 15/005 |
| CN | 109636031 | A | * | 4/2019 | |
| CN | 110171346 | A | | 8/2019 | |
| CN | 109319080 | B | * | 11/2020 | B63J 3/00 |
| DE | 102009037367 | A1 | * | 2/2011 | B60K 1/04 |
| DE | 10 2009 055845 | A1 | | 6/2011 | |
| DE | 102011018457 | A1 | | 10/2012 | |
| DE | 102015201895 | A1 | * | 8/2016 | B60L 53/64 |
| DE | 102016008028 | | * | 2/2017 | |
| DE | 102016008028 | A1 | * | 2/2017 | |
| DE | 102016220848 | A1 | * | 4/2018 | |
| DE | 102017207023 | A1 | * | 10/2018 | B60L 53/57 |
| DE | 102017210541 | A1 | * | 12/2018 | B60L 53/14 |
| DE | 102018004740 | A1 | * | 12/2018 | |
| DE | 102017220478 | A1 | * | 5/2019 | |
| GB | 2460500 | A | * | 12/2009 | B60L 11/1818 |
| GB | 2525068 | A | * | 10/2015 | B60L 11/1824 |
| JP | H08177470 | A | | 7/1996 | |
| JP | 2004194414 | A | | 7/2004 | |
| JP | 2008506523 | A | | 3/2008 | |
| JP | 2009136109 | A | | 6/2009 | |
| JP | 2011130575 | A | | 6/2011 | |
| JP | 2011214930 | A | * | 10/2011 | |
| JP | 2012048286 | A | * | 3/2012 | |
| JP | 2012231559 | A | * | 11/2012 | B60L 11/1861 |
| JP | 2012231559 | A1 | * | 11/2012 | |
| JP | 3195806 | U | | 2/2015 | |
| JP | 2018181334 | A | | 11/2018 | |
| KR | 101758706 | B1 | * | 7/2017 | |
| KR | 20170097359 | A | | 8/2017 | |
| WO | WO-2012046269 | A1 | * | 4/2012 | B60L 3/12 |
| WO | WO-2019112586 | A1 | * | 6/2019 | |

* cited by examiner

FAST-CHARGING STATION AND METHOD FOR CHARGING ELECTRICALLY OPERATED LAND VEHICLES, WATERCRAFT, AIRCRAFT AND/OR WORK MACHINES AND/OR BATTERIES

The present disclosure relates to a fast-charging station and a method for charging electrically operated land vehicles, watercraft, aircraft and/or work machines and/or batteries.

BACKGROUND

At present, work machines in construction or agriculture are driven by combustion engines.

Due to increasing environmental regulations in the area of noise and exhaust gas emissions, the operation of such machines is becoming more and more difficult in densely populated regions.

The complexity of the exhaust aftertreatment systems required by the legislators is increasing to a rather uneconomical degree for small diesel engines, compared to the basic engine costs. It will therefore be necessary in the future to drive work machines in the lower power range fully electrically (e.g., small excavators, wheel loaders, dump trucks, work platforms, telehandlers, etc.). However, no charging infrastructure is presently available for machinery of this type. The use of such machines is therefore limited at the present time to the electrically developed area. This results in a low market acceptance for such machines, since the applications for the equipment are extremely limited.

SUMMARY

Due to the lack of charging possibilities, the operating time of such small work machines achievable at the present time is not sufficient, or the necessary battery capacity makes the use of a device of this type uneconomical, due to the cost of the electrical energy store.

It is an object of the present disclosure to provide a standalone fast-charging station, which makes it possible to keep a fleet of small electrically operated work machines continuously in operation, as well as a method therefor.

The present disclosure provides a fast-charging station for charging electrically operated land vehicles, watercraft, aircraft and/or work machines and/or batteries, including at least one internal combustion engine and at least one fuel tank and/or a fuel cell and/or at least one generator and/or at least one backup battery and/or at least one high-power capacitor and/or at least one photovoltaic element and/or at least one flywheel store and/or a charging device and/or a mains connection, and a method for charging electrically operated land vehicles, watercraft, aircraft and/or work machines and/or batteries using a fast-charging station. It is advantageous that a sufficient power supply may always be ensured independently of the local conditions. After all, if a sufficiently dimensioned electrical mains connection exists, the backup battery, the high-power capacitor and the flywheel store may be charged in this way to thereby subsequently charge the electric vehicles. If no or only an insufficiently dimensioned electrical mains connection exists, either the internal combustion engine and the generator coupled thereto or the photovoltaic element or the fuel cell may charge the backup battery, the high-power capacitor and the flywheel store.

Fast-charging device 1 known as "POWERTREE" advantageously permits the simultaneous fast charging of work machines operated by high-current systems.

The POWERTREE may be configured in different design sizes, depending on the demand of the work machine fleet to be supplied, and also includes an inverter to be ready for all voltage and frequency requirements. A combustion engine is used as the drive; depending on the emission requirements, a natural gas, gasoline, diesel or hydrogen engine is used. Alternatively, a fuel cell may also be used to ensure a noise- and exhaust gas emission-free operation. The option also exists to integrate the POWERTREE into an existing electricity network and to thus operate the unit locally and fully emission-free as a fully electric charging station. The costs of an exhaust aftertreatment system of an internal combustion engine in compliance with the law are incurred only once and are thus distributed to an arbitrary number of work machines. The exhaust aftertreatment system may be perfectly adapted to the application. It is further advantageously provided that the fast-charging device includes at least one particle filter and/or at least one exhaust gas catalytic converter in the exhaust tract, so that the internal combustion engine used may always be operated in an optimal operating point. This results in significant savings of fuel and the reduction of emissions, and only one exhaust gas management system is necessary, and regeneration problems of particulate filter systems, due to low-load applications in small work machines, are avoided, and the question of whether or not an SCR system is to be used, due to cost reasons, also does not even arise.

It is possible to operate an entire fleet of electrically driven work machines at any arbitrary location even without any infrastructure.

The fast-charging device may be advantageously operated with natural gas or hydrogen and/or gasoline or diesel fuel. The desired fuel for the entire machine fleet may be quickly changed by selecting the corresponding POWERTREE. Another advantageous refinement provides that it includes at least one roof, and that the roof is designed to be opened and closed. This ensures protected charging operations during charging and for easier transportation between the particular places of use.

One advantageous refinement provides that the fast-charging station includes at least one control or regulating unit, which logs and evaluates the driving profiles of the electric vehicles to thereby suggest, as a function of the transmitted operating states of the individual electric vehicles, the best possible breaks for charging to be displayed in the cockpit of each vehicle. In a further advantageous embodiment, it is provided that the vehicles are autonomously induced to stop charging at the POWERTREE by the control or regulating unit.

A further advantageous refinement provides that the fast-charging station includes at least one antenna, the antenna being connected to the control or regulating unit so that a smooth and cable-free or wireless communication is possible between the POWERTREE and the electric vehicle.

Another advantageous refinement provides that the fast-charging station includes at least one current transfer device or communication transfer device, and that it may be cascaded. In this way, the infrastructure may be expanded cost-effectively, depending on the local requirements.

A continuous operation of the electric work machines is advantageously possible in the manner described above.

The POWERTREE fast-charging unit is arbitrarily scalable and may thus be adapted to the corresponding fleet size and power demand.

If a fuel cell is used, a completely emission-free operation of the POWERTREE is possible.

All work machines to be supplied are integrated into the charge management system of the POWERTREE in a radio-linked manner. The optimal point in time for recharging the individual machines is determined by fuzzy logic as a function of the particular state of charge and optimally integrated into the operating cycles of the individual machines.

The communication between the POWERTREE and the vehicle or the battery of the particular vehicle takes place in that the vehicle type, the vehicle identification number, the battery type, the battery identification number, the battery cell type, the battery cell interconnection, the manufacture date of the battery, the state of charge of the battery, the state of charge of individual cells of the battery, the maximum permissible charging current, the temperature of the battery, the minimum and maximum temperature of individual cells, the minimum and maximum temperature of the battery cooling, the type of battery cooling, the number of charge cycles of the battery, the type of the charging operations—fast charging or normal charging, gentle charging—the recording of the load profile for the battery on the construction side, the prediction of the charging demand, due to the operating cycle of the machine, with the aid of fuzzy logic, manual charging requests of the operator(s) of the vehicle, the desired time of day, the desired charging type—fast charging, normal charging, quantity of current—the charging request with regard to the desired quantity of current within a predefined time unit, the transferred quantity of current, the point in time of the current transfer, billing data for the current transfer, the security code of the current transfer, the security code for billing, the type of charging plug, the geographical position of the charging plug for estimating the distance from the POWERTREE, the type of induction system, the geographical position of the induction system for estimating the distance from the POWERTREE, the geographical position of the battery to be charged for estimating the distance from the POWERTREE, the geographical position of the vehicle to be charged to estimate the distance from the POWERTREE, the time setting of the charging operation at the vehicle, at the POWERTREE or its control unit or server are transmitted with the aid of a radio link to be stored there or in a cloud-based server and further processed to then be converted into specific control commands, such as "now drive vehicle to the POWERTREE by the shortest route to charge the battery," and to be transmitted to the vehicle with the aid of a radio link. Moreover, the POWERTREE includes a radio remote-controllable drone, with the aid of which overview maps of the construction site may be regularly prepared, and which may also be transferred to the POWERTREE or its control unit or server with the aid of a radio link to be stored there or in a cloud-based server and further processed. These redundant position data are used to fine-tune the overall system and document the construction progress on the construction site. Block chain.

The "map" of the construction site as well as the transmitted data sets may be combined with each other or "chained" with the aid of cryptographic methods using block chain technology, which represents a continuously expandable list of data sets. An irreversible, incorruptible time stamp is generated in globally known block chains (e.g., Bitcoin) and documented with the aid of certificates, which verify the ownership of the stored file and the exact contents at this point in time.

POWERTREE 1 is made up of a generator unit, which is driven with the aid of an internal combustion engine. Alternatively, a fuel cell is used or available mains current is fed in. A buffer furthermore exists in the form of high-current-capable storage cells 4 and/or high-power capacitors. The energy density needed for fast-charging the individual work machines may be provided hereby. A further specific embodiment provides that fast-charging station includes a flywheel store, which is accommodated in fast-charging station or, depending on the capacity requirements, is electrically coupled to fast-charging station in 20" or 40" containers to be provided. In urban environments, in particular, a flywheel store of this type may be used in the vicinity of municipal rail or tram systems to temporarily store the brake energy of these trains. In a further alternative embodiment, it is provided that fast-charging station includes photovoltaic modules, which are either situated at or on the POWERTREE or are electrically coupled thereto and situated in available open spaces or on the provided containers. The energy transmission to the device takes place with the aid of automatically coupling high-current connections or alternatively through induction surfaces.

IEC 62196 is an international standard for a series of connector types and charging modes for electric vehicles and is maintained by the International Electrotechnical Commission (IEC). The standard is valid in Germany as DIN standard DIN EN 62196. It is made up of multiple parts, which have been adopted sequentially. The third part was published in June 2014. The standardization process for Part 4 (plug connections for light electric vehicles) began in June 2015.

The standard takes over the IEC-61851 definition of a signal pin, which switches the charging current; the charging station remains deenergized until an electric vehicle is connected. The vehicle may then not be placed into operation during the charging operation.

The Part 1 definitions for the signal pin and its IEC-62196-1 charging modes have found their way into other technical regulations. In addition to the IEC 60309 "CEE-form" rotary current plugs, the charging modes were also taken over for the SAE-J1772 connector in North America (designed by Yazaki), for the CHAdeMO plug in Japan and for the Mennekes plug (VDE-AR-E 2623-2-2) in Europe. Each of these connectors forms the basis for a network of public charging stations of the energy providers.

IEC 62196-1 relates to plug connectors (plugs), outlets, sockets and preassembled cables for electric vehicles, which are used for cable-bound charging systems. They are specified for a range of 690 V AC voltage with 50 to 60 Hz and a rated current of up to 250 A; 600 V DC voltage with a rated current of up to 400 A.

The charging modes are based on the specifications of IEC61851-1:

IEC 61851-1 "Mode 1"—slow charging at household outlets including earth contact (safety plugs);

IEC 61851-1 "Mode 2"—single-phase to three-phase charging per fixed-coded signal on the plug side;

IEC 61851-1 "Mode 3"—charging with the aid of specific charging plug systems for electric vehicles including pilot and control contacts;

IEC 61851-1 "Mode 4"—fast charging with control by an external charger.

Class 1 charging modes are provided for single-phase or three-phase alternating current up to a current intensity of 16 amperes. The cable includes the phase(s), the neutral conductor and the protective grounding. A pilot contact for facilitating the charging operation is not absolutely necessary here. Plugs and cables that support less than 16 amperes are not signaled by a signaling system, but instead it is provided that the maximum current intensities are indicated on the devices themselves. A use of IEC-60309 industrial plugs is not necessary, but instead simpler plug systems, such as safety plugs, may be used.

Class 2 charging modes are provided for device current of up to 32 amperes, which are frequently found in both single-phase and three-phase configurations. The signaling to the vehicle is limited to fixed values, the pilot contact for charge release may be bridged by connection. The industrial plugs according to IEC 60309 ensure the current-carrying capacity on the network side due to the housing size; correspondingly different connecting adapters for 16 A or 32 A signal this in the vehicle-side plug. Other industrial plugs having a specification of 32 A and more may also be used. When connected to a safety plug, an ICCB, which ensures the class 2 signaling to the vehicle, is necessary in the cable for high charging capacities.

Class 3 charging modes are provided for fast charging up to 250 A. Simple plugs including a pilot contact according to class 2 may be used, but they limit the charging current to 32 A. A suitable charging mode must be recognized for higher charging currents. The reference to the IEC 60309 standard takes over the physical parameters for a corresponding charging system of up to 250 A, for example the cable diameter and the pin diameter in the plug. The maximum permissible charging current or the availability of digital communication is coded with the aid of pulse width modulation. The communication forms the basis for controlled charging of electric vehicles to influence the charging operation in a targeted manner.

Class 4 charging modes are provided for fast charging with direct current up to 400 A. A suitable signaling makes it possible for unsuitable charging plugs to remain deenergized.

The standard part IEC 62196-1 refers to the plug types in IEC 60309. These continued to be used as charging plugs for electric vehicles, while the following charging plug systems were created specifically for use in the area of automobiles. Efforts exist to connect the battery management of the vehicles to the smart grid of the energy providers.

The standard part IEC 62196-2 describes the plug types for connection to alternating current. At the request of the European Commission for a standard charging plug, ETSI and CEN-CENELEC took up the work in June 2010. The Commission expected a result by the middle of 2011. The circulation of IEC 62196-2 began on Dec. 17, 2010 with an end date by May 20, 2011. The finished IEC standard was published on Oct. 13, 2011. This time frame was possible since the standard was able to be based on existing standardizations of charging plug systems.

The following types were placed on the list of charging plugs of the IEC 62196-2 standard:

IEC 62196-2 "Type 1"—single-phase vehicle coupler takes over the specification from SAE J1772/2009;

IEC 62196-2 "Type 2"—single- and three-phase vehicle coupler takes over the specification from VDE-AR-E 2623-2-2;

IEC 62196-2 "Type 3"—Single- and three-phase vehicle coupler with shutters takes over the suggestions by the EV Plug Alliance.

Other plug types according to IEC 62196-1 were the Framatome plug by EDF, the SCAME plug in Italy and the CEEplus plug variants in Switzerland.

Public charging stations according to IEC 62196, which include a certain connecting socket (e.g., SAE J1772 or CEEplus), may also be used with other plug types with the aid of adapters—however, the current is not activated until an IEC-61851-compliant signal pin reports the presence of an electric vehicle. In addition, the current is limited to 16 A until an IEC-62196-compliant signal is detected, which enables a charging mode having a higher current intensity.

BRIEF DESCRIPTION OF THE DRAWINGS

Further advantageous embodiments of the present disclosure are apparent from the description of the drawing, which describes in greater detail an exemplary embodiment illustrated in the figures.

DETAILED DESCRIPTION

Figure 1:
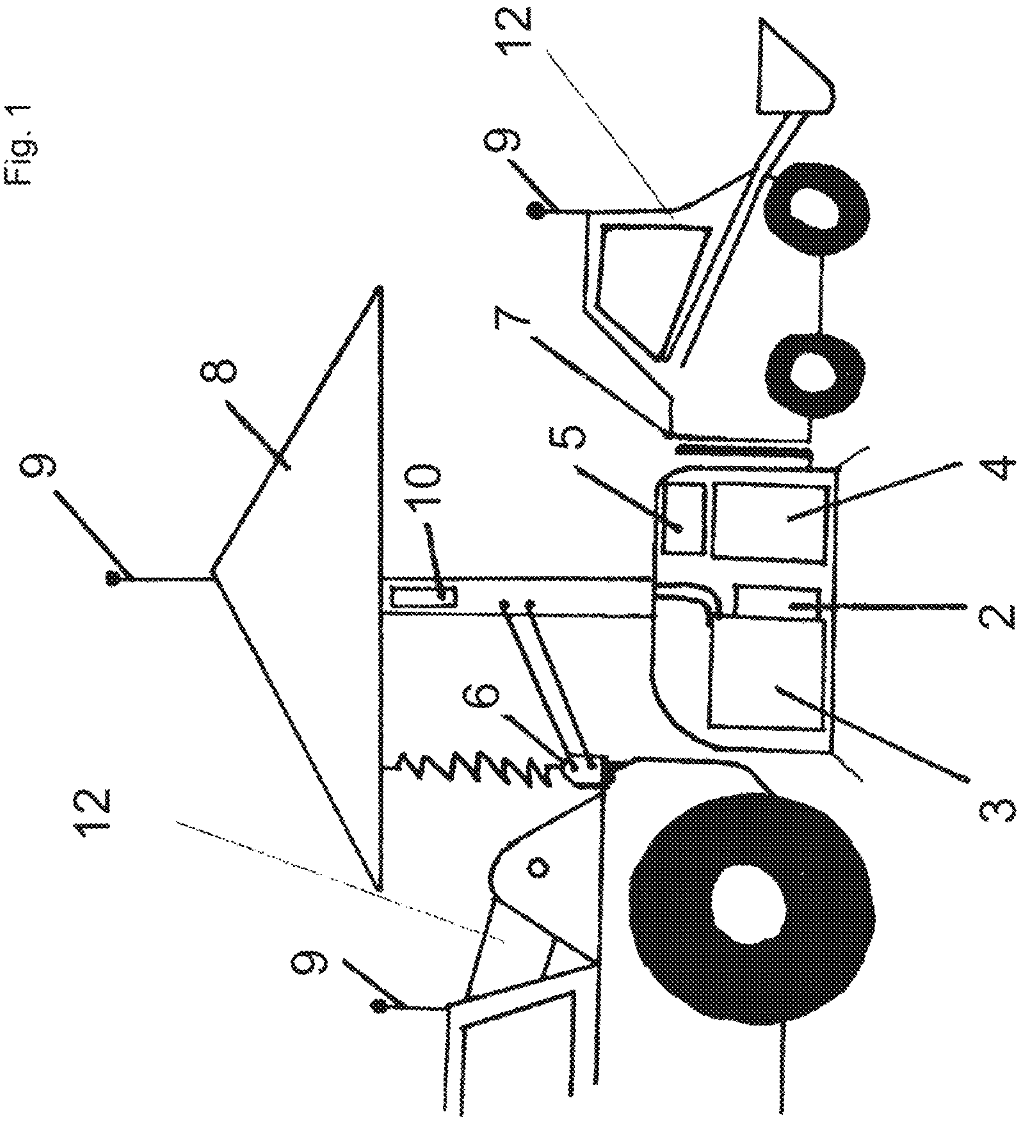
FIG. 1 shows a fast-charging station including two electric construction site vehicles being charged.

POWERTREE 1 is made up of a generator unit 2, which is driven with the aid of an internal combustion engine 3. Alternatively, a fuel cell is used or available mains current is fed in. A buffer furthermore exists in the form of high-current-capable storage cells 4 and/or high-power capacitors 5. The energy density needed for fast-charging the individual work machines may be provided hereby. A further specific embodiment provides that fast-charging station 1 includes a flywheel store, which is accommodated in fast-charging station 1 or, depending on the capacity requirements, is electrically coupled to fast-charging station 1 in 20" or 40" containers to be provided. In urban environments, in particular, a flywheel store of this type may be used in the vicinity of municipal rail or tram systems to temporarily store the brake energy of these trains. In a further alternative embodiment, it is provided that fast-charging station 1 includes photovoltaic modules, which are either situated at or on the POWERTREE or are electrically coupled thereto and situated in available open spaces or on the provided containers The energy transmission to the device takes place with the aid of automatically coupling high-current connections 6 or alternatively through induction surfaces 7.

The POWERTREE includes an extendable roof 8, similar to that of a sunshade, which protects the easily transportable fast-charging unit against the weather and is used as a transfer point for connecting the high current to the work machines. The POWERTREE looks like a tree and is movable, so as to be moved to the vehicle if an electric vehicle is immobilized.

The data transfer with regard to the state of charge/cell management and storage temperature of the individual work machines takes place bidirectionally and wirelessly to the central data processing system of the POWERTREE.

Cableless transmission methods are data transmission methods which use free space (air or vacuum) as the transmission medium. No cable in the form of an electrical conductor (wire) or optical fiber is needed for the transmission; methods in the radio frequency range, in particular, are therefore also referred to as wireless transmission methods.

The transmission takes place via directional or omnidirectional electromagnetic waves, the range of the frequency band used being variable from a few Hertz (low frequency) to multiple hundreds of terahertz (visible light), depending on the application and technology used.

Cableless transmission methods are used, in particular, in application areas in which cable-bound transmission technologies may not be employed.

Transmission methods which are not medium-bound include:

Bluetooth, WLAN, ZigBee, NFC, Wibree or WiMAX in the radio frequency range, as well as IrDA and free-space optical communication (FSO) in the infrared or optical frequency range, RFID, mobile radio communication, GSM, UMTS and LTE (GERAN, UTRAN or E-UTRAN act as air interfaces here), broadcasting (in particular, antenna and satellite TV as well as radio).

A public land mobile network (PLMN) is understood to be a land-based, public mobile radio network. One of the best known standardized PLMNs is the GSM network. The Global System for Mobile Communication (GSM) is a circuit-switched cellular communication network, in which two users communicate with each other via an explicit (virtual) line.

The GSM network is divided into three different subsystems:

The base station subsystem (BSS) contains components which provide an infrastructure for the connection between the network (or NSS) and a mobile user via the air interface. Important network elements are the base transceiver station (BTS) and the base station controller (BSC).

The network substation (NSS) forms the central component of a GSM network and is responsible for call switching and user management. In addition to other mobile switching points, connections may also be set up to the national or international land-line network. The most important network element is the mobile switching center (MSC) described below.

The intelligent network (IN) subsystem is not divided into components; it is made up of databases which provide additional services. For example, credit balances may be managed in real time via the prepaid service.

The components are to be explained in greater detail below.

The mobile station (MS) represents the end user of a GSM network, usually in the form of a mobile phone. The most important component of an MS is the SIM card. It contains, among other things, a secret number, which is important for authenticating the MS but is not transferred.

In addition to the integrated circuit card identification (ICCID), which uniquely identifies the SIM card, each user is assigned a unique number which uniquely identifies him/her globally within a GSM network. The international mobile subscriber identity (IMSI) is made up of three constituents. The first three digits form the mobile country code (MCC), which identifies the associated country (e.g., 262 for Germany). The next two digits form the mobile network code (MNC), which identifies the provider (e.g., 01 for T-Mobile). In Germany, the Federal Network Agency determines the assignment of the associated MNC to the corresponding operator.

At the international level, the International Telecommunication Union (ITU), which is responsible for specifying the IMSI, makes this decision. The last ten digits of the IMSI are individually assigned to the user by the particular provider and are referred to as the mobile subscription identification number (MSIN).

In addition to the IMSI, a call number, the mobile subscriber ISDN number (MSISDN), is also assigned to the MS. Multiple call numbers may be assigned to an IMSI, since the IMSI (and not the MSISDN) acts as the primary key. The call number may thus be changed at any time without replacing the SIM card, since the MSISDN is not permanently stored on the SIM card. The MSISDN is made up of a country code (CC), e.g., 49 for Germany, and a three-digit prefix of the network operator, the national destination code (NDC), for example (0)1622. The base transceiver station (BTS) forms the interface between the cable-bound connection and the air interface. A BTS may theoretically cover an area having a radius of up to 35 kilometers. In the case of most base transceiver stations, in particular in urban areas, the radius is only 3 to 4 kilometers, and even only a few hundred meters in residential areas. This covered area is also known as a cell. During a connection, the call data are sent via a BTS, which may change during the course of the connection. The transmission power, and thus also the range, may deviate according to residential density, the terminal normally being the limiting component. The cells have a unique ID (cell ID) and are usually modeled in a honeycomb.

Multiple cells (approximately 20) are combined into a location area (LA).

A location area is defined via a unique number, the location area identity (LAI), which is made up of the aforementioned MCC, MNC and an individual identifier, the location area code (LAC). The tasks of the BTS include, among other things, the management of the radio channels, modulation of the signals and encryption and decryption of the data. The antennas cover only an area of no more than 180°, for which reason multiple antennas are usually mounted on one radio tower, often three antennas each having a coverage of 120°. There are more than 52,000 base stations in Germany.

The base station controller (BSC) forms the central unit of the BSS and bundles the connections of all BTSs connected thereto. The connection management is implemented via a switching matrix, which routes data from the individual BTSs to an MSC (see below) and vice versa. The so-called A-bis interface (BTS $ BSC) is usually implemented with the aid of a 2 Mbit line, which is divided into virtual channels having a bandwidth of 64 kbits/s). The tasks of the BSC includes, not only controlling the BTS (e.g., by power regulation), but above all organizing the handover. A handover is a task of the BSC only as long as the source and destination BTSs are situated within the same BSS.

If the two radio towers are in different BSSs, the responsibility for managing the handover is transferred to the MSC. If an MS has a weak signal strength, the BSC is responsible for deciding the cell in which a handover is to take place. The BSC furthermore includes a database, in which status information about the entire BSS is stored, e.g., all cells in its location area and all signal strengths of the users.

This component was introduced to relieve the workload of the MSC, so that the network structure from the MSC to the end users may be represented as a tree topology.

The mobile switching center (MSC) forms the main component of an NSS, which manages and controls multiple BSSs. The billing of fees and authorization of mobile stations as well as the recording of call data associated therewith are among the most important tasks of this component. Once an MS has been activated, it registers with the MSC and may be reached by other users. The setup of a connection and the forwarding of SMS texts are controlled by this component. If an MS changes location areas, it must carry out a location area update, i.e., notify the responsible MSC of the location area in which it is located. The MSC may thus search for the MS within this location area in the case of an incoming connection in that it sends a paging request to all cells (BTS) situated within this location area. A large mobile radio network is made up of dozens or even hundreds of independent MSCs. To forward and store short messages (SMS), not only the MSCs exist but also the short message service center (SMSC), which handles the dispatch and management of SMS texts. To manage mobile users, the MSC uses databases, which are described below.

The home location register (HLR) represents the most important database within a GSM network. It is a static register, which permanently assigns the IMSI to each user as the primary key. The HLR contains IMSI, basic services (e.g., telephony, SMS, data services, fax), additional services (e.g., CLIR5), IMSI $ call number assignment (MSISDN), authentication center (AC), which stores authentication information (e.g., the secret key of the SIM card). The MSRN (mobile station roaming number) is a temporary ID for locating users of external networks.

Each MSC includes its own database, which contains an extract from the HLR. This so-called visitor location register (VLR) may also be viewed as a temporary HLR, which contains the users registered with an “MSC-specific” BTS. when checking whether a mobile station is within the influence area of an MSC, it is no longer necessary to request the global HLR, but only the local VLR. This results in a higher performance connection setup and less load on the HLR.

While the HLR tends to store static information, the VLR contains predominantly dynamic data, such as IMSI, TMSI, call number (MSISDN), LAI (=MCC+MNC+LAC), MSRN, handover number.

The temporary mobile subscriber identity (TMSI) is a temporary ID, which is transmitted instead of the IMSL This is intended to preserve the anonymity of a user and avoid movement profiles.

The equipment identity register (EIR) manages the hardware identification numbers of the mobile stations, the so-called international mobile equipment identity (IMEI). Each mobile phone includes a globally unique hardware number of this type.

The IMEI is made up of a type allocation code (TAC), which identifies not only the registration office (first two digits) but also the device type. The TAC is followed by an individual serial number (SNR) and finally also a checksum.

The EIR is divided into three different lists: The “white” list is made up of all existing IMEIs, the “gray” list contains IMEIs that are released for tracking, and the “black” list contains the IMEIs of stolen or blocked mobile phones. Stolen mobile phones may be requested and possibly located via the black list, so that a replacement of the SIM card is not sufficient to conceal the theft. Changing the IMEI is difficult to do in the software, but it may be emulated with respect to the network. The EIR is an additional database, whose use depends on the provider.

The air interface, also referred to as the Um interface, designates the air interface between a mobile station and the BTS.

The air interface of GSM is divided into three layers, which are explained below.

On physical layer 1 of the Um interface, two different multiplexing technologies are used to allow as many users as possible to communicate simultaneously. The first method divides the frequency per cell among multiple users and is therefore referred to as frequency division multiple access (FDMA). The second technology divides the channel into multiple time slots (bursts) and bears the designation time division multiple access (TDMA). Up to 8 users may communicate simultaneously per carrier frequency having a 200 kHz bandwidth with the aid of TDMA. A TDMA frame is therefore made up of 8 time slots and is transferred in 4.615 ms. Assuming that a BTS radios on n different frequencies, subtracting 2 channels for signaling on the first carrier frequency, this would result in 8n-2 time slots.

A GSM burst is made up of a guard time, which represents a time buffer, in which no data are transferred. This is attributed to the mobility of the users, which have different distances from the BTS, and data may thus arrive with a time delay. In order for the recipient to identify the beginning and end of a burst, a known bit pattern (three zeros) is also sent, known as a “tail.” An always identical bit pattern, which is used for error correction, is situated in the middle of the burst. With the aid of this pattern (also known as a training sequence), signal corruptions may be compensated for, which result, e.g., due to reflection/multiple propagation. So-called stealing flags also exist, which indicate whether useful data or signaling information is present in the data fields. Each GSM burst lasts for 577 microseconds and transfers 114 bits of useful data over the logical channels mentioned below.

The bursts have a different format for synchronization, frequency correction and access. Since there are more signaling channels than time slots, 51 TDMA frames are combined into a constantly repeating multiframe in the GSM, which establishes in which burst (time slots 0 and 1 within a TDMA frame) which logical channels are transferred. In addition to this common configuration, it is also possible to use only the first time slot for the signaling channels for the benefit of the useful data channels. The useful data channels are situated in a repeating multiframe of 26 frames, which runs in parallel to the multiframe of 51 frames. The above division applies only to frames on the first carrier frequency. All further frequencies contain only multiframes of 26 frames and may thus use all 8 bursts for useful data.

The LAPDm protocol is used on the safety layer (layer 2) of the air interface. It is a modification of the link access procedure for the D channel (LAPD) of the ISDN D channel. The m stands for modified. There are three different formats of the 184-bit LAPDm frame. The A format is used as a “filler” frame if no useful data to be sent are present. The B format is used to transport SDCCHs, FACCH and SACCH, the maximum length of the useful data depending on the channel. Finally, there is also the Bbis format, which is used to transfer BCCH, PCH and AGCH, i.e., only the downlink. Since the messages of this channel are sent to all users in a location area, Bbis frames do not include any identification numbers. The structure of an LAPDm frame is illustrated below, based on the example of the B format, in which, for example, an SDCCH may be situated, which transports, e.g., an SMS text. A B frame is initially made up of a field, which fills out the frame to 184 bits, since some channels transport less signal data than others. The field containing the frame length (including segmentation information) of the signal data and the last two fields each have a length of 8 bits. The control field describes the frame type and indicates whether it is an information frame, monitoring frame (e.g., for indicating the readiness to receive) or an unnumbered frame (e.g., connection setup/release). Frame checksums, like those for ISDN in LAPD, are not present, since the first layer already takes care of error corrections.

The address field provides more detailed information about the frame. The 2-bit long link protocol discriminator (LPD) codes the cell broadcast service (CBS) with 01 and is otherwise always 00. The service access point identifier (SAPI) (3 bits) classifies the signal data (e.g., 0 for CC/MM/RR (see below) or 3 for supplementary services (SS) and SMS), while the command or response (C/R) field codes a 0 for command frames and a 1 for reply frames. Finally, the extended address (EA) field marks whether a further address octet follows and therefore always has the value 1 in the LDAPm, since the address field is the last address octet.

The third layer of the air interface distinguishes between message types, which, in turn, are divided into groups. The ID type contains the protocol discriminator (PD), which divides the messages or reports into groups. Possible groups are radio resource management (RR) with PD=6, mobility management (MM) with PD=5, call control (CC) with PD=3, call-independent supplementary services (SS) with PD=B, SMS messages with PD=9. Different message types are assigned to each group. For example, the immediate assignment message type belongs to the RR group, message types relating to a location update belong to the MM group, and messages for call control (e.g., connect, disconnect) belong to the CC group.

The first ten messages for radio resource management (RR) are listed below, since they are the most important ones with regard to the establishment of a useful data connection. The RR messages also include classmark enquiry, measurement report, ciphering mode command, ciphering mode complete, assignment command, assignment complete, channel release and handover. Paging request 1 is a request to page all base transceiver stations within a location are The recipient of a call or an SMS text is sought.

System information type 1 means that the BTS communicates which channels it has (cell allocation). A channel identifies itself via the ARFCN (absolute radio frequency channel number, uplink and downlink frequencies).

System information type 2 means that the frequencies of the neighboring cells (broadcast channels) of a BTS are transferred.

System information type 3 means information about the cell, e.g., cell ID, LAC and parameters relating to available channels.

System information type 4 contains, in part, information of the preceding messages and channel properties relating to GPRS.

System information type 5 means channels, where the MS may register during a call.

System information type 6 means that the MS is notified of where it is located (cell ID and LAC).

Channel request means a channel request of an MS, including the reason, e.g., in response to a paging request, (emergency) call or location update.

Immediate assignment means a response to a channel request and assignment of a special useful data channel (cf. SDCCH in the channel overview).

Paging response means negotiating parameters for call setup, e.g., which encryption algorithm was supported by MS and MTS, power of the MS and possible frequency bands of the MS.

The communication between the mobile station and the BTS is divided into diverse logical channels.

The combinations in which the individual channels occur within a multiframe varies and depends on the network operator. The uplink defines the direction MS->BTS and the downlink consequently defines the direction MS<-BTS.

The broadcast channels (BCH) use the BTS for point-to-multipoint channels to the particular MS. These channels are downlink channels.

The frequency correction channel (FCCH) contains so-called frequency correction bursts, an unmodulated signal which is used for synchronization (find the beginning of the 51 multiframe) and later for error correction of the frequency between the MS and BTS.

With the aid of the synchronization channel (SCH), the MS may find a cell or the BCCH of a BTS and synchronize therewith.

The broadcast control channel (BCCH) is used as an identification channel of a cell. The location area code (LAC), MCC, MNC, Cell ID, the uplink and downlink frequencies (ARFCN) and the frequencies of the neighboring cells, among other things, are made known via this channel. The frame number, which is used to send a request on the PCH (see below) or which frame numbers are available for a request on the RACH, also belongs to the information spectrum of the BCCH.

The cell broadcast channel (CBCH) is used to distribute special information (e.g., news, weather, traffic) to all users within range.

Although the CBCH, viewed logically, is a broadcast channel, from a technical perspective, however, it is assigned to the SDCCH (see below) within whose time slot it also transmits. The messages transmitted by this channel are not confirmed by the mobile phone.

The common control channels (CCCH) are used primarily to set up connections and usually affect multiple users.

The paging channel (PCH) notifies the MS of incoming data, e.g., a call or an SMS text. A paging request is sent to all cells in a location area where the user to be called is located. The IMSI or TMSI is used as the call name.

A mobile station may send communication requests to the BTS via the random access channel (RACH). These requests usually contain the desire to access a special (dedicated) channel. The MS sends a channel request message for this purpose. Since the different users are not synchronized with each other, uncontrollable collisions may not occur. The RACH is thus a pure uplink channel.

The access grant channel (AGCH) notifies the MS after a successful communication on the RACH, using an immediate assignment message about an initial assignment to an SDCCH. About the issuance of the SDCCH and TCH decides the BSC.

The dedicated control channels (DCCH) are special channels which affect only one user. With the exception of the TCH, they are comparable to the data channel of an ISDN. All DCCHs are both uplink and downlink channels (MS<->BTS).

The standalone dedicated control channel (SDCCH) is used for signaling and initial setup of calls between the MS and BTS if no TCH (see below) is yet available to the user. In addition, the SDCCH contains signaling data, which do not require a TCH, such as a location update or the emission or reception of an SMS text.

The fast associated control channel (FACC) is a control channel which transfers urgent signal data, for example a handover command during an existing connection. Since such urgent signaling messages occur comparatively rarely, a separate burst is not made available for the FACCH. Instead it is transferred instead of the useful data, and the stealing flag is set in the GSM burst. It is carried out in the time slot of the TCH (see below) and also belongs thereto from a technical perspective.

The slow associated control channel (SACCH) contains signal measurements of the active cell and the neighboring cells in the uplink. For example, a handover or a power adjustment may be ordered, based on these results. The latter is communicated in the downlink of the SACCH, together with timing information. Since this information affects an active connection, the SACCH is set up together with the TCH.

The traffic channel (TCH) is the voice or useful data channel and corresponds to a basic channel of an ISDN. GSM uses different types of the TCH.

A distinction is initially made between the full rate speech traffic channel (TCH/FS) and the half rate speech traffic channel (TCH/HS). On this basis, TCHs of different transfer rates are defined, e.g., TCH/F9.6 for a TCH/F having 9.6 kbits/s is used within a DCCH to prevent disturbances between neighboring cells. At least one of the following pieces of information is required to conduct frequency hopping:

Cell allocation (CA): a list of all available frequencies (ARFCNs) within the own cell (sent by BCCH);

Mobile allocation (MA): a selection of frequencies from the CA list, together with the hopping sequence;

Hopping sequence number (HSN): a value between 0 and 63, which indicates the hopping distance;

Mobile allocation index offset (MAIO): a frequency number, which is also between 0 and 63 (value range of MA). Based on this offset, the MSs are distributed over all available frequencies within a TDMA frame.

Frame number (FN): a variable value, which contains counters which change the hopping sequence.

In the case of an immediate assignment on the AGCH, MAIO and HSN are also sent, along with the newly assigned SDCCH. During a voice call, frequency hopping also tracks the intention to protect the call against attacks. It is considered proven that only slightly more calculations and bandwidth are needed to circumvent this protection.

The following examples are intended to illustrate the aforementioned channels and GSM components in use in selected scenarios. The following scenarios do not take into account specific encryption and authentication aspects.

The following scenarios describe the establishment of a voice channel on the side of the call recipient.

The BSC receives a paging request from the MSC, including IMSI, TMSI and location area of the recipient. The BSC subsequently sends a paging request to all BTSs within the indicated location area, which it takes from its database. All BTSs forward the paging request via the PCH to all users within range. The relevant user logs onto the RACH and is assigned its own SDCCH via the AGCH (immediate assignment message), on which the MS and MSC communicate about the setup of a voice connection. The encryption or authentication takes place at this point. Once this has been done, the MSC sends an assignment request to the BSC, including the instruction to set up a TCH. The BSC subsequently activates a free TCH in the BTS and notifies the MS of the assigned TCH via the SDCCH. The MS then changes to the indicated TCH and confirms the successful acceptance via the FACCH to the BTS, which also confirms via the FACCH. Finally, the MS sends an "assignment complete" to the BSC via the BTS (FACCH).

If a user moves out of the range of a BTS, it must be passed on to a radio cell having a better signal quality. This form of passing on is called a handover. A handover is initiated by the BSC, based on the signal values of the present cell and the neighboring cell measured via the SACCH. Based on these measured data, the BSC may decide into which cell the MS is to change. Before the change may take place, the BSC must activate a TCH in the new BTS. Only then does the BSC send the handover command via FACCH, using the old BTS. This command contains the new frequency and the time slot number of the new TCH. The MS may subsequently synchronize with the new BTS, in that it sends a handover access message in four consecutive bursts. In the fifth burst, the user sends an SABM message (secured call request) to the BTS, which sends a confirmation to the BSC upon correct identification. Finally, the BSC must also release the old TCH. If the new cell were to be situated outside the influence area of the BSC, the responsible MSC would have to be included for a successful handover, since the BSCs are not connected to each other. In the case of a handover during an active call (as described here), the MSC is finally informally notified, even if the handover has taken place within a BSC.

WLANs may be operated in different modes, depending on the hardware equipment and needs of the operator.

The WLAN infrastructure mode resembles the mobile radio network in terms of its structure: A wireless access point, often in the form of a router, handles the coordination of all clients and sends small data packets, so-called "beacons," to all stations in the receiving area at settable intervals (usually ten times per second). The beacons contain, among other things, the following information, such as network name ("service set identifier," SSID), a list of supported transfer rates and the type of encryption.

This "beacon" makes the connection setup significantly easier, since the clients must know only the network name and optionally a few parameters for the encryption. At the same time, the continuous dispatch of the beacon packets makes it possible to supervise the reception quality, even if no useful data are sent or received. Beacons are always sent at the lowest transfer rate (1 Mbit/s), and the successful receipt of the "beacon" thus also does not guarantee a stable connection to the network.

Devices according to the Bluetooth SIG standards send, as short range devices (SRD), in a license-free ISM band (industrial, scientific and medical band) between 2.402 GHz and 2.480 GHz. They are allowed to be operated license-free worldwide. Disturbances may, however, be caused, for example, by WLANs, cordless telephones (DECT telephones in Europe have a different frequency band) or microwave ovens, which operate in the same frequency band. To achieve robustness against disturbances, a frequency hopping method is used, in which the frequency band is divided into 79 channels within the 1 MHz spacing, which is changed up to 1,600 times per second. However, packet types also exist, in which the frequency is not changed as often (multislot packets). A frequency band exists at the upper and lower end in each case as a guard band to neighboring frequency ranges. Theoretically, a data transfer rate of 706.25 kbits/s upon receipt and simultaneously 57.6 kbits/s upon sending may be achieved (asymmetrical data transfer).

Starting with version 2.0+EDR, data having EDR (enhanced data rate) may be transferred a maximum of approximately three times as fast, i.e., at approximately 2.1 Mbits/s. Starting with version 1.1, a Bluetooth device may maintain up to seven connections simultaneously, the participating devices having to share the available bandwidth (shared medium).

Bluetooth supports the transfer of voice and data. However, most devices may manage only three users in a piconet during the necessarily synchronous transfer of voice.

An encryption of the transferred data is also possible.

The actually achievable range depends not only on the sending power but also on a multiplicity of parameters. This includes, for example, the sensitivity of a receiver and the designs of the transceiver antenna used on radio communication links. The characteristics of the surroundings may also influence the range, for example walls as obstacles within the radio communication links. The types of data packets may also influence the achievable range, which is between 10 meters and 100 meters outdoors, due to differences in length and security mechanisms.

To permit higher transfer rates over the globally available 2.45-GHz ISM frequency band, Bluetooth SIG is planning the alternate MAC/PHY Bluetooth enhancement; in this case, the PHY and MAC layers of the IEEE-802.11 specifications will be added to Bluetooth.

A contactless but cable-bound inductive charging plug system without open contacts provides for the charging of the battery contactlessly by induction after an induction element is plugged into a slot at one of the vehicle sides or at the front or the back. The electrically operated vehicle may be charged, for example, in three hours using a stationary 7-kW charger or in approximately 15 hours using a 1.2-kW charger. Higher charging currents result in shorter charging times.

One specific embodiment provides for installing the charging system for the electric vehicles in the roadway or the construction site surface. During vehicle operation or parking, energy may be transferred contactlessly with the aid of induction. The inductive charging at stops provided specifically for this purpose, which are activated by the fast-charging station, is provided in a further exemplary embodiment. Another specific embodiment provides for short overhead line sections at these stops, which are situated in such a way that they may be reached from the electric vehicle using extendable pantographs. A further specific embodiment provides for storing the energy in POWERTREE in flywheels and/or, in particular, in capacitor stores. For example, in urban areas, the brake energy, e.g. of trams, may be electrically transferred via the overhead line to flywheels located in containers on the edge of rails or the construction site to thereby charge the vehicles at the construction site.

This method ensures short intermediate charges or short charging times, which are easy to schedule and make it possible to significantly reduce the necessary battery capacity and thus the vehicle costs without limiting the autonomy of the vehicles too much.

Figure 2:
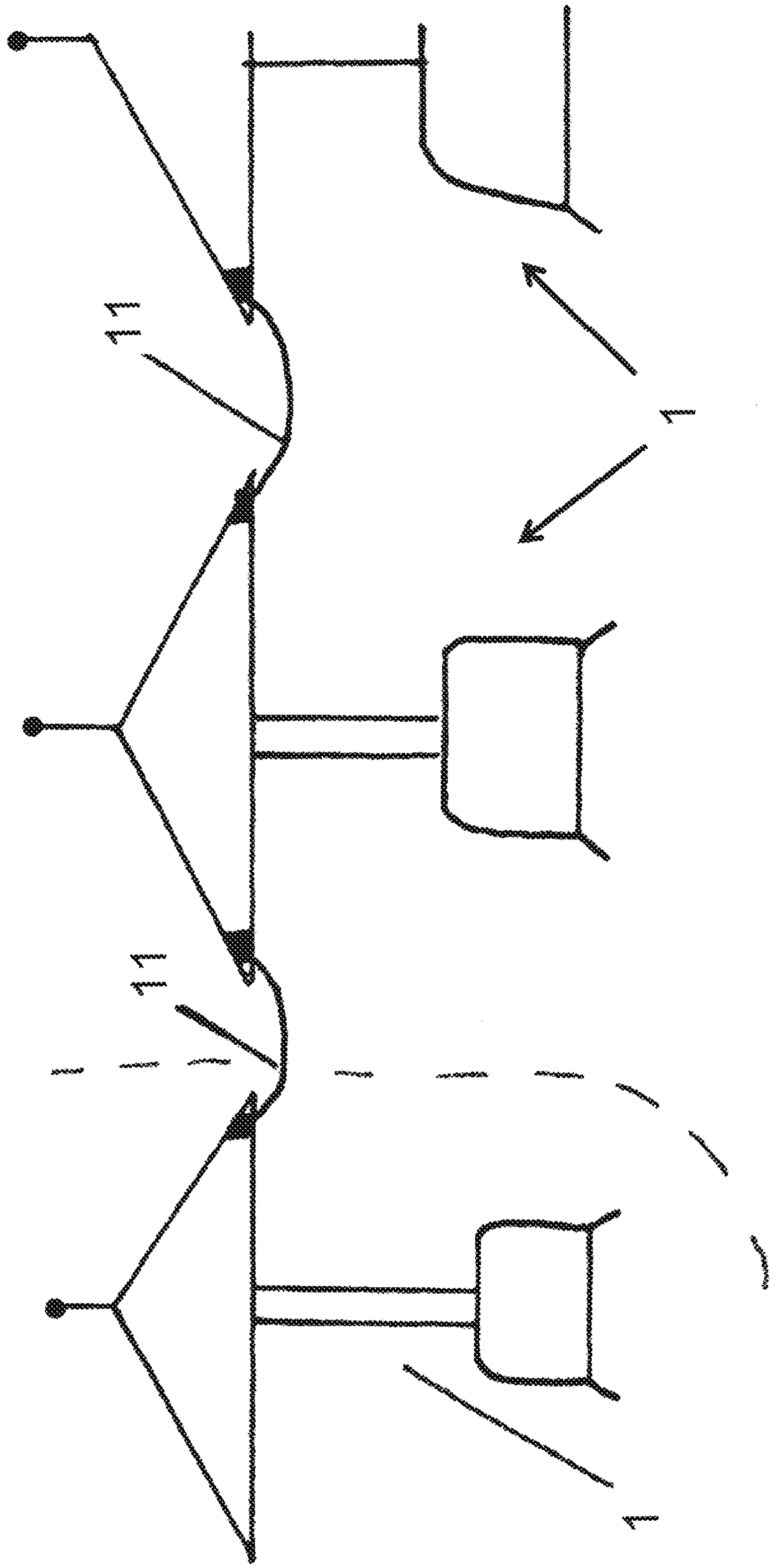
FIG. 2 shows three cascaded fast-charging stations.

The POWERTREE has a control or regulating unit in the form of the master function of battery management 10 of individual work machines 12 and assigns the optimal charging point in time at the POWERTREE or its cascaded attachments to the different work machines, as is described in FIG. 2. The control or regulating unit of the POWERTREE ascertains a suitable charging period as a function of the particular states of charge of electric vehicles 12, which transfer the latter to the POWERTREE with the aid of a radio link, to keep the electric vehicles always ready for operation. Moreover, the electric vehicles transfer the air pressure of their tires, the state of charge of their battery and the temperature of the battery. The POWERTREE detects the work behavior and the time management of the individual work machines with the aid of fuzzy logic and continuously optimizes the charging operations.

The energy supply still available may thus be displayed to the machine drivers at any time, and the optimal charging point in time may be suggested. However, the machine driver is able to report special requests with regard to charging times to the POWERTREE, and they are then taken into account in the overall power management of all machines.

The modular structure of the POWERTREE makes it possible to cost-effectively add further pure "power transfer TREES" to the basic module as needed with the aid of current transfer or communication transfer devices 11, as illustrated in FIG. 2.

REFERENCE NUMERALS

1 POWERTREE/fast-charging station
2 generator unit/generator
3 combustion engine/internal combustion engine
4 storage cell/backup battery
5 high-power capacitor
6 high-current connection/charging device
7 induction surface/charging device
8 roof
9 antenna
10 data processing device (computer) battery management
11 communication transfer device
12 work machine

What is claimed is:

1. A fast-charging station for charging batteries of electrically operated machines, the electrically operated machines including electric vehicles, watercraft, aircraft or work machines, the fast-charging station comprising:
an internal combustion engine;
at least one of:
a fuel tank, a fuel cell, a generator, a backup battery, a high-power capacitor, a photovoltaic element or a flywheel store;
a charging device for connecting the fast-charging station to the electrically operated machine; and
a control or regulating unit for communicating with the electrically operated machines, wherein the control or regulating unit is configured to log and evaluate driving profiles of the electric vehicles to suggest, as a function of transmitted operating states of each of the electric operated vehicles, breaks for charging to be displayed in a cockpit of each electric vehicle.

2. The fast-charging station as recited in claim 1, further comprising at least one of a particle filter or an exhaust gas catalytic converter in an exhaust tract.

3. The fast-charging station as recited in claim 1, wherein the fast-charging station is configured for being operated by at least one of natural gas, hydrogen, gasoline or diesel fuel.

4. The fast-charging station as recited in claim 1, further comprising a roof covering.

5. The fast-charging station as recited in claim 4, wherein the roof is openable and closeable.

6. The fast-charging station as recited in claim 1, further comprising an antenna, the antenna being connected to the control or regulating unit.

7. The fast-charging station as recited in claim 1, further comprising a wireless data transfer device.

8. The fast-charging station as recited in claim 1, further comprising a current transfer or communication transfer device that is cascadable with a further fast-charging station.

9. A method for charging electrically operated land vehicles, watercraft, aircraft, work machines and/or batteries, the method comprising:
performing a charging using the fast-charging station as recited in claim 1.

10. The method as reciting in claim 9, wherein the charging involves charging a plurality of work machines, the method further comprising integrating the work machines into the fast-charging station via radio link.

11. The method as reciting in claim 10 further comprising detecting a work behavior of the work machines by fuzzy logic.

12. The method as reciting in claim 9, wherein the charging involves charging a work machine, the method further comprising installing the fast-charging station at a construction site.

* * * * *